United States Patent [19]
Minden et al.

[11] Patent Number: 5,600,665
[45] Date of Patent: Feb. 4, 1997

[54] MULTIPLE OUTPUT FIBER LASER WITH PASSIVE FREQUENCY CONTROL AND METHOD

[75] Inventors: Monica L. Minden, Calabasas; Celestino J. Gaeta, Simi Valley, both of Calif.

[73] Assignee: Hughes Aircraft Company, Los Angeles, Calif.

[21] Appl. No.: 508,727

[22] Filed: Jul. 28, 1995

[51] Int. Cl.$^6$ ........................................... H01S 3/30
[52] U.S. Cl. ................... 372/6; 372/102; 372/97; 372/19; 372/18; 372/32
[58] Field of Search ..................... 372/6, 92, 18, 372/102, 19, 97, 26, 32

[56] References Cited

U.S. PATENT DOCUMENTS

| | | | |
|---|---|---|---|
| 5,187,760 | 2/1993 | Huber | 372/6 |
| 5,511,083 | 4/1996 | D'Amato et al. | 372/6 |

OTHER PUBLICATIONS

Hill et al., "Bragg gratings fabricated in monomode photosensitive optical fiber by UV exposure through a phase mask", *Applied Physics Letters*, vol. 62, No. 10, Mar. 8, 1993, pp. 1035–1037.

G. A. Ball et al., "Design of a Single–Mode Linear–Cavity Erbium Fiber Laser Utilizing Bragg Reflectors", *Journal of Lightwave Technology*, vol. 10, No. 10, Oct. 1992, pp. 1338–1343.

Saleh et al., "Fundamentals of Photonics", *John Wiley & Sons, Inc.*, 1991, pp. 581–519.

*Primary Examiner*—Leon Scott, Jr.
*Attorney, Agent, or Firm*—V. D. Duraiswamy; W. K. Denson-Low

[57] ABSTRACT

A passively controlled multiple output fiber laser system in which the frequency relationships between all of the optical outputs remain constant over time includes a plurality of fiber lasers for generating respective output beams. The lasers are positioned in close proximity to each other so that they experience the same environmental conditions. Each laser includes at least one Bragg reflection grating that controls the frequency and bandwidth of the laser's output beam. The Bragg gratings are formed so that they respond equally to environmental changes. In a preferred embodiment, the fiber lasers are made from a plurality of substantially identical photosensitive fibers, and Bragg gratings are exposed simultaneously under identical exposure conditions in each of the fibers. A multiple output fiber laser system suitable for heterodyne LADAR systems is also provided.

17 Claims, 2 Drawing Sheets

FIG.3

MULTIPLE OUTPUT FIBER LASER WITH PASSIVE FREQUENCY CONTROL AND METHOD

BACKGROUND OF THE INVENTION

1. Field of the Invention

This invention relates to fiber lasers, and more particularly to a multiple output fiber laser system with passive frequency control and a method for making the same.

2. Description of the Related Art

Target detection systems, such as a laser radar (LADAR), typically use a pulsed optical signal beam from a pulsed laser to track moving targets. One such LADAR system is described in co-pending U.S. patent application Ser. No. 08/369,023 filed on 5 Jan. 1995, entitled "RANDOM PULSE BURST RANGE-RESOLVED DOPPLER LASER RADAR" by Joseph N. Paranto et al., and assigned to Hughes Aircraft Company, the assignee of the present invention.

The pulsed signal beam reflects from a target and is collected and sent to a heterodyne receiver, which mixes reflected pulses with a local oscillator beam, typically an optical beam from a continuous-wave (CW) laser. For effective heterodyne detection of the reflected signal beam, the frequency relationship between it and the local oscillator beam must remain constant over time. This creates a problem because the local oscillator and pulsed signal beams are created by two separate lasers whose operating frequencies drift over time due to, among other factors, changes in environmental conditions (i.e., temperature, stress, strain).

Prior systems overcome this problem by utilizing tunable single-longitudinal mode (single-mode) solid state lasers to generate the local oscillator beam, such as those described in B. E. A. Saleh, et al., "Fundamentals of Photonics," *John Wiley & Sons*, 1991, pp. 518–519. The local oscillator beam is actively tuned to track any drifts in the frequency of the pulsed signal beam. These tunable lasers are very expensive and they increase the total size and complexity of the LADAR system due to the associated tuning and feedback circuits that are required.

SUMMARY OF THE INVENTION

In view of the above problems, the present invention provides a passively controlled multiple output fiber laser system in which the frequency relationships between all of the optical outputs remain substantially constant over time.

This is accomplished by providing a plurality of fiber lasers for generating respective output beams. The lasers are positioned in close proximity to each other so that they experience the same environmental conditions. Each laser includes at least one Bragg reflection grating that controls the frequency and bandwidth of the laser's output beam. The Bragg gratings are formed so that they respond equally to environmental changes. Therefore, the frequency relationships between all of the output beams remain substantially constant.

In a preferred embodiment, the fiber lasers are made from a plurality of photosensitive fibers from a common fiber stock. The Bragg gratings are exposed simultaneously under identical exposure conditions in each of the fibers using established Bragg grating exposure techniques. Thus, any environmentally induced stress will be common to all the fibers and will produce substantially identical frequency shifts in all the fiber lasers.

A multiple output fiber laser system suitable for heterodyne LADAR systems is also provided in which one of the fiber lasers is configured as a mode-locked, multi-mode pulsed laser that generates a pulsed signal beam, and a single-mode, CW laser that generates a CW local oscillator beam. A preferred method of making the present invention is also provided.

These and other features and advantages of the invention will be apparent to those skilled in the art from the following detailed description of preferred embodiments, taken together with the accompanying drawings, in which:

DETAILED DESCRIPTION OF THE INVENTION

Figure 1:
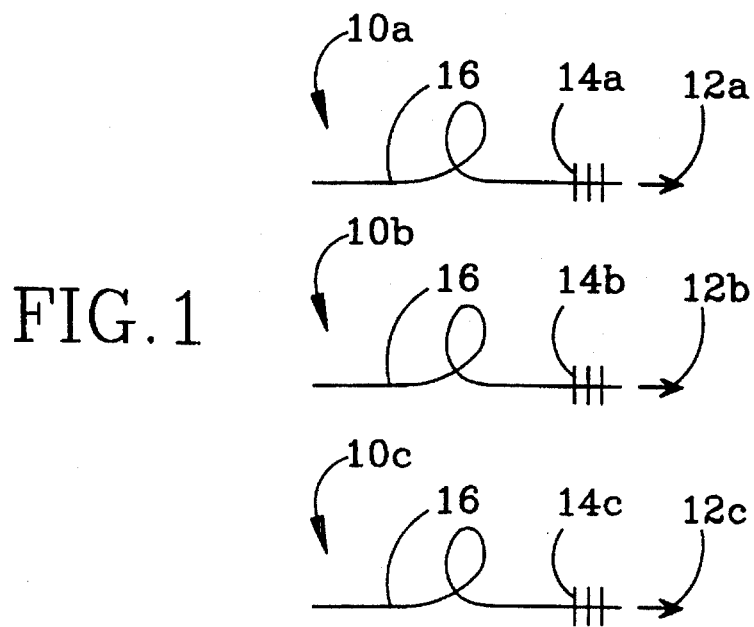
FIG. 1 is a schematic diagram illustrating the basic principles of the invention.

FIG. 1. illustrates the basic principles of the invention. A plurality of optical fiber lasers 10a–10c are configured to generate a plurality of output beams 12a–12c, and are positioned in close proximity to each other so that they experience substantially the same environmental conditions. The term "environmental conditions" is used to refer to any external factor that could influence the laser's lasing frequency including, but not limited to, temperature, mechanical stress, mechanical strain and radiation exposure.

The fiber lasers each include at least one Bragg reflection grating 14a–14c that determines the frequency and bandwidth of the respective laser's optical beam. The Bragg gratings 14a–14c are formed so that they respond substantially equally to changes in environmental conditions. In operation, the frequency relationships between output beams 12a–12c remain constant because any environmental changes will affect each of the Bragg gratings 14a–14c in the same manner. In the preferred embodiment, doped photosensitive optical fibers 16 from a common fiber stock are used as the laser gain media, and the Bragg gratings 14a–14c are written in the cores of the fibers. The fibers 16 are suitably AT&T EDF-HC fiber, and are preferably doped with erbium to provide a central lasing wavelength of approximately 1.5 microns. Wavelengths greater than approximately 1.5 microns are considered "eyesafe", which is preferred in LADAR systems. Furthermore, the absorption in the glass cladding around an optical fiber is minimized at 1.5 microns. The preferred dopant for making the fibers 16 photosensitive is germanium, which makes the fibers sensitive to ultraviolet (UV) light.

Figure 2:
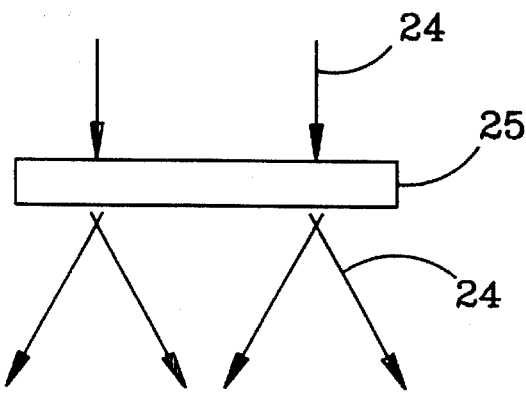
FIG. 2 is a perspective view illustrating a preferred method of forming the Bragg gratings used in the embodiment of FIG. 3.
Figure 2:
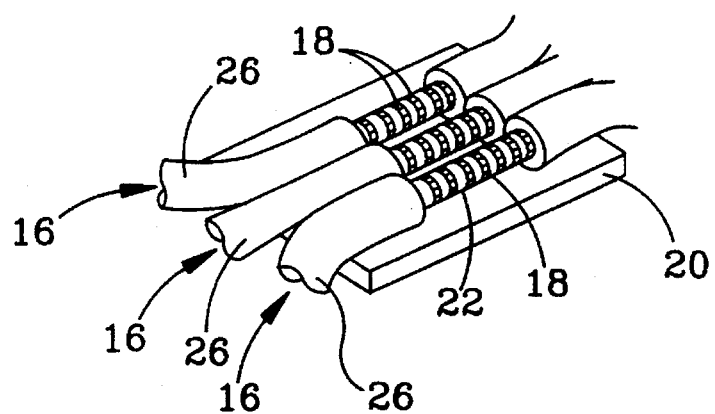

FIG. 2 illustrates a preferred method of forming the Bragg reflection gratings 18 in the optical fibers 16. The portion of each fiber 16 that is to be imprinted with a Bragg grating 18 is attached to a substrate 20 that is preferably thermally conductive and transparent to ultraviolet light, such as quartz. The fibers are preferably attached to the substrate 20 outside the grating region with an adhesive (not shown), such as epoxy.

The gratings 18 are formed by simultaneously exposing the fiber cores 22 to ultraviolet (UV) light 24 that has been passed through a phase mask 25, following the technique described in Hill et al., "Bragg gratings fabricated in monomode photosensitive optical fiber by UV exposure through a phase mask," *Applied Physics Letters*, Vol. 62, No. 10, Mar. 8, 1993, pp. 1035–1037. Briefly, the UV light 24 is passed through phase mask 25, which diffracts the light into multiple diffraction orders. The substrate 20 is spaced from the phase mask 25 so that the diffracted orders optically interfere in the photosensitive fiber core 22 and modulate its index of refraction. In FIG. 2, a portion of the fiber cladding 26 has been removed to illustrate the gratings 18 that are formed in the fiber core 22. In practice, the UV light 24 penetrates the cladding, so that the cladding 26 does not need to be removed to expose the gratings 18.

It is critical that all the gratings 18 be formed under substantially the same UV exposure conditions. To ensure this, a UV beam 24 with substantially uniform intensity over its width may be used, with the fibers 16 positioned as close as possible to each other on the substrate 20 (i.e., in physical contact with each other) so that each fiber core 22 receives substantially the same amount of UV exposure. If different grating reflectivities are required, then the lower reflectivity gratings are exposed through the mask for a shorter time and the remaining UV exposure is made without the mask.

Although the fibers 16 may be removed from the substrate 20 after the gratings 18 are formed, they are preferably left attached to ensure that any environmental changes are experienced equally by each fiber grating 18. For example, a thermally conductive quartz substrate 20 will help ensure that each fiber grating 18 experiences the same ambient temperature. In addition, the substrate 20 helps to mechanically protect the fiber portions that contain the gratings 18.

Figure 3:
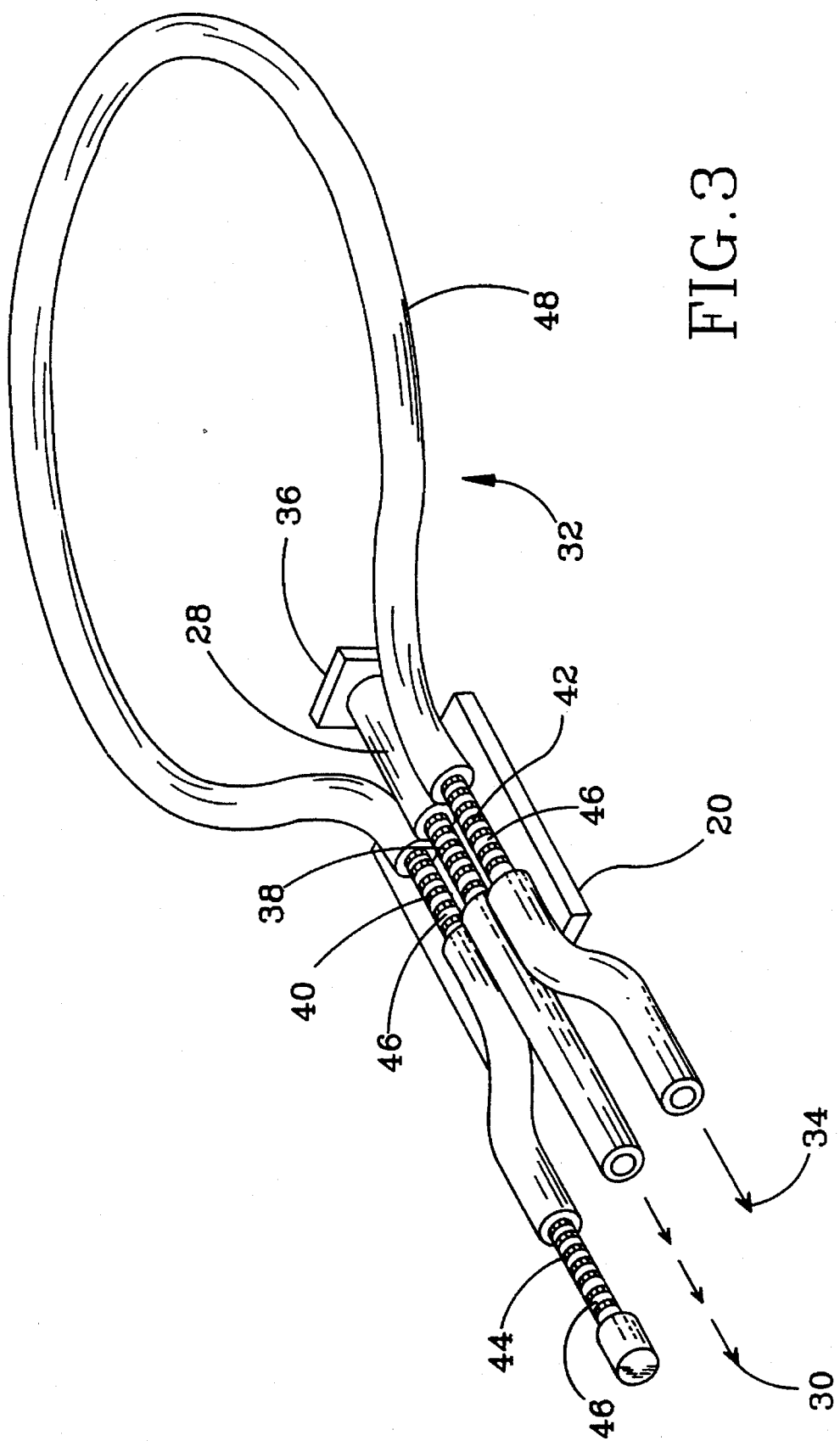
FIG. 3 is a perspective view of a multiple output laser system embodiment that is suitable for heterodyne LADAR systems.

FIG. 3 illustrates an embodiment suitable for heterodyne LADAR systems, such as the one disclosed in the co-pending U.S. patent application cited above. The embodiment comprises a pulsed multi-mode fiber laser 28 that generates a pulsed signal beam 30 and a single-mode CW fiber laser 32 that generates a CW local oscillator beam 34. The pulsed and CW fiber lasers 28 and 32 are preferably fabricated from the same fiber stock, and preferably include Bragg reflection gratings 38, 40 and 42 that are formed in accordance with the method described above in connection with FIG. 2.

Bragg reflection gratings 38 and 42 form part of the CW fiber laser's 32 resonant cavity. Optical fiber lasers with intra-cavity Bragg grating reflectors are generally known, and are described in G. A. Ball et al., "Design of a Single-Mode Linear-Cavity Erbium Fiber Laser Utilizing Bragg Reflectors," *Journal of Lightwave Technology*, Vol. 10, No. 10, October, 1992, pp. 1338–1343. The pulsed fiber laser 28 is preferably a mode-locked laser that utilizes a nonlinear reflector 36 as part of its optical cavity. This type of laser is described in co-pending U.S. patent application Ser. No. 08/369,050 filed on 5 Jan. 1995 now U.S. Pat. No. 5,488,620 on Jan. 30, 1996, entitled "PASSIVELY MODE LOCKED-LASER AND METHOD FOR GENERATING A PSEUDO RANDOM OPTICAL PULSE TRAIN" by Monica Minden, and assigned to Hughes Aircraft Company. As explained above, the periodicity of the Bragg gratings in a fiber laser determine the laser's operating frequency and its bandwidth. Bragg gratings 38, 40 and 42 in the CW and pulsed fiber lasers 28 and 32 are preferably formed with the same periodicity so that the frequency of signal beam 30 and local oscillator beam 34 are approximately equal, which is preferred for heterodyne systems.

The spacing between a laser's frequency modes and the bandwidth of the optical reflectors that make up the laser cavity determine whether the laser operates single-mode or multi-mode. If only a single mode is present over the bandwidth of the optical reflectors, the fiber laser will operate single-mode. Conversely, if the spacing between the laser's frequency modes is so small that multiple modes are present within the bandwidth of the optical reflectors, the laser will operate multi-mode. In pulsed fiber laser 28, the spacing between Bragg grating 38 and nonlinear reflector 36 determines the laser's frequency mode spacing, and its operating bandwidth is determined by the bandwidth of Bragg grating 38, because the grating has a narrower bandwidth than that of the nonlinear reflector 36. Therefore, the spacing between Bragg grating 38 and nonlinear reflector 36 is preferably adjusted so that only the desired number of modes are present within the bandwidth of Bragg grating 38.

The fiber 48 that is used for CW fiber laser 32 is looped around so that Bragg gratings 40 and 42 (which function as two cavity reflectors) can be formed simultaneously in the fiber core 46, aligned with each other and on opposite sides of the Bragg grating 38, in accordance with the method described above. In the preferred embodiment, the CW fiber laser 32 includes a back reflector, preferably a Bragg grating back reflector 44 that is formed in the fiber core 46 before Bragg gratings 40 and 42 are formed. Without Bragg reflector 44, the frequency mode spacing would be determined by the spacing between gratings 40 and 42. The spacing between gratings 40 and 42 refers to the distance between them as experienced by light travelling along the fiber core 46 (i.e., the spacing between them if the fiber 48 were extended along a straight line). Since the CW fiber laser 32 is preferably a single-mode laser for use as a local oscillator in a heterodyne system, the spacing between Bragg gratings 40 and 42 would have to be short relative to the spacing between Bragg grating 38 and nonlinear reflector 36 in CW multi-mode laser 28. To accomplish this, a short fiber 48 would have to be used and bent sharply so that the two gratings 40 and 42 could be formed simultaneously. The sharp bend can cause optical losses in the fiber 48.

When Bragg grating back reflector 44 is added, the laser mode spacing is determined by the spacing between the two closest Bragg gratings. Therefore, the spacing between grating 40 and 42 may be as long as needed to avoid bending the fiber 48 too sharply, as long as the spacing between gratings 44 and 40 is short enough to allow single-mode operation. Bragg grating 44 is preferably a 100% reflectivity grating with a bandwidth that is wider than that of gratings 40 and 42. This allows the frequency of operation and the bandwidth of laser 32 to be controlled by the bandwidth of gratings 40 and 42. In addition, since grating 44 is not formed at the same time as gratings 40 and 42, it will not respond to environmental changes in a manner identical to gratings 40 and 42. If the bandwidths of all the gratings were made equal, the center frequency of gratings 40 and 42 could drift outside of the bandwidth of grating 44 due to their different responses to environmental changes. By making the bandwidth of grating 44 wider than that of the other gratings, some drift in the center frequency of gratings 40 and 42 can be tolerated. Although a Bragg grating back reflector 44 is used in the preferred embodiment, other types of back reflectors may be used, such as a mirror coupled to fiber 48 with an optical coupler.

In operation, fiber lasers 28 and 32 are optically pumped (not shown) and emit a mode-locked, multi-mode pulsed signal beam 30 and a CW single-mode local reference beam 34, respectively. Because gratings 38, 40 and 42 have the same periodicity, the frequencies of the signal and local reference beams 30 and 34 are substantially the same. The spacing between grating 38 and reflector 36 in multi-mode laser 28 is preferably adjusted so that the mode spacing between the multiple frequency modes of signal beam 30 is equal to or smaller than the inverse of the time it takes the laser beam to return from the farthest target of interest.

Numerous variations and alternate embodiments will occur to those skilled in the art without departing from the spirit and scope of the invention. A multiple output fiber laser for LADAR systems was described as one type of fiber laser system that may be fabricated in accordance with the invention. Fiber laser systems for other applications that require a constant frequency relationship between the multiple output beams may be formed as long as the fiber lasers each include at least one Bragg grating that responds to environmental changes in substantially the same manner as the Bragg gratings of the other fibers. Such variations and alternate embodiments are contemplated, and can be made without departing from the spirit and scope of the appended claims.

I claim:

1. A multiple output fiber laser system with passive frequency control, comprising:

a first optical fiber resonant cavity for generating a first optical beam, at least one other optical fiber resonant cavity for generating at least one other-optical beam, each of said resonant cavities comprising at least one Bragg reflection grating that determines-the cavity's lasing frequency, said resonant cavities positioned so that their respective Bragg gratings are in close proximity to each other, so that said gratings experience substantially the same environmental conditions, wherein said Bragg gratings respond substantially equally to changes in said environmental conditions, so that the frequency relationships between said optical beams remain substantially constant over time.

2. The system of claim 1, wherein at least one of said resonant cavities comprises a single-longitudinal mode continuous-wave (CW) fiber laser.

3. The system of claim 2, wherein said at least one other of said resonant cavities comprises a mode-locked multi-longitudinal mode fiber laser.

4. The system of claim 3, wherein said fiber lasers are mounted on a common substrate.

5. A multiple output fiber laser system with passive frequency control, comprising:

a thermally conductive substrate, a first continuous-wave (CW) single-longitudinal mode optical fiber laser attached to said substrate, and configured to generate a local reference beam at a first frequency, and a pulsed, multi-longitudinal mode optical fiber laser attached to said substrate, and configured to generate a pulsed, multi-longitudinal mode signal beam at generally the same frequency as said local reference beam, wherein each of said optical fiber lasers comprises at least one Bragg reflection grating that determines the laser's lasing frequency, said fiber lasers positioned so that their respective Bragg gratings are in close proximity to each other on said substrate, so that said gratings experience substantially the same environmental conditions, wherein said Bragg gratings respond substantially equally to changes in said environmental conditions, so that the frequency relationships between said local reference and signal beams remain substantially constant.

6. The system of claim 5, wherein said CW fiber laser comprises two Bragg reflection gratings, with said CW fiber laser positioned on said substrate so that its respective Bragg gratings are aligned on opposite sides of a Bragg grating in said pulsed fiber laser.

7. The system of claim 6, wherein a high reflectivity back reflector is optically coupled to said CW fiber laser, said back reflector having a bandwidth that is wider than said Bragg grating bandwidths.

8. The system of claim 7, wherein said back reflector comprises an additional Bragg grating.

9. The system of claim 5, wherein said Bragg reflection gratings have substantially equal periodicities and bandwidths.

10. The system of claim 5, wherein a nonlinear reflector is optically coupled to said pulsed fiber laser for mode-locking said pulsed signal beam.

11. A method of passively controlling the frequency of a multiple output fiber laser, comprising the steps of:

providing a plurality of photosensitive optical fibers from a common fiber stock that are doped to exhibit optical gain, forming at least one Bragg reflection grating in a core of each of said fibers, wherein each of said Bragg gratings forms part of a resonant cavity in its respective optical fiber and respond substantially equally to environmental changes, and positioning said fibers so that their respective Bragg gratings are in close proximity to each other, so that said Bragg gratings experience substantially the same environmental conditions.

12. The method of claim 11, wherein said Bragg gratings are formed by:

generating an optical beam having a wavelength that corresponds to a wavelength to which said waveguide is photosensitive, spatially modulating the intensity of said beam, and simultaneously exposing each of said photosensitive optical fiber cores to said modulated optical beam for equal periods of time so that the indices of refraction of said fiber cores are modulated by equal amounts in accordance with said intensity modulation.

13. The method of claim 12, wherein at least one Bragg grating is positioned in at least one of said optical fibers to form part of a continuous-wave (CW) single-longitudinal mode laser cavity, and at least one other Bragg grating is positioned in at least on other of said optical fibers to form part of a mode-locked, multi-longitudinal mode, pulsed laser cavity.

14. The method of claim 13, wherein said at least one Bragg grating is formed in an optical fiber that is coupled to a back reflector having substantially 100% reflectivity over a predetermined bandwidth.

15. The method of claim 14, wherein said at least one other Bragg grating is formed in an optical fiber that is optically coupled to a nonlinear reflector.

16. The method of claim 12, wherein said fiber cores are exposed to said beam by:

mounting said fibers on a substrate that is thermally conductive and that is optically transparent at said optical beam's wavelength, and directing said spatially modulated optical beam to said substrate so that it illuminates all of said fibers simultaneously.

17. The method of claim 16, wherein said optical beam is modulated by diffracting it with a phase mask grating.

* * * * *